(12) United States Patent
Leutard et al.

(10) Patent No.: US 8,028,954 B2
(45) Date of Patent: Oct. 4, 2011

(54) ARCHITECTURE FOR A HYDRAULIC SYSTEM FOR OPERATING AIRCRAFT LANDING GEAR

(75) Inventors: David Leutard, Chatillon (FR); Eric Felemez, Crespieres (FR); Sebastien Fremiot, Boulogne (FR)

(73) Assignee: Messier-Bugatti, Velizy Villacoublay (FR)

( * ) Notice: Subject to any disclaimer, the term of this patent is extended or adjusted under 35 U.S.C. 154(b) by 873 days.

(21) Appl. No.: 11/873,590

(22) Filed: Oct. 17, 2007

(65) Prior Publication Data

US 2008/0087765 A1    Apr. 17, 2008

(30) Foreign Application Priority Data

Oct. 17, 2006   (FR) ...................................... 06 09093

(51) Int. Cl.
| B64C 25/10 | (2006.01) |
| B64C 25/14 | (2006.01) |
| B64C 25/20 | (2006.01) |

(52) U.S. Cl. .................................................. 244/102 R
(58) Field of Classification Search .............. 244/102 R, 244/104 R, 50, 111
See application file for complete search history.

(56) References Cited

U.S. PATENT DOCUMENTS

| 2,459,665 | A | * | 1/1949 | Majneri | ..................... 244/102 R |
| 3,173,630 | A | * | 3/1965 | Milana | ............................. 244/50 |
| 6,792,844 | B1 | * | 9/2004 | Gedge et al. | ..................... 91/436 |

FOREIGN PATENT DOCUMENTS

| GB | 757 705 A | 9/1956 |
| GB | 973 364 A | 10/1964 |

* cited by examiner

*Primary Examiner* — Rob Swiatek
*Assistant Examiner* — Valentina Xavier
(74) *Attorney, Agent, or Firm* — Sughrue Mion, PLLC

(57) ABSTRACT

The invention relates to an architecture for a hydraulic system for operating the landing gear of an aircraft including at least one pressure source and at least one hydraulic return, the system having a hydraulic circuit comprising a first hydraulic line that, when pressurized, causes the landing gear to be lowered, and a second hydraulic line that, when pressurized, causes the landing gear to be raised, said lines being selectively pressurized by means of a hydraulic distribution member comprising at least an isolation valve and a selector for putting one of the lines into communication with pressure and the other line into communication with return. According to the invention, the architecture includes passive bypass means for bypassing the selector, said means being disposed between the second line and an admission line that extends between the isolation valve and the selector, and forced return connection means for forcing the isolation valve to isolate the pressure circuit of the aircraft and connect the admission line to return.

5 Claims, 2 Drawing Sheets

ARCHITECTURE FOR A HYDRAULIC SYSTEM FOR OPERATING AIRCRAFT LANDING GEAR

The present invention relates to an architecture for a hydraulic system for operating aircraft landing gear.

BACKGROUND OF THE INVENTION

Aircraft are known that include hydraulic systems for operating landing gear of an aircraft that includes at least one hydraulic pressure source and at least one hydraulic return. The hydraulic system for operating the landing gear comprises actuators for moving undercarriages, which actuators are connected by a hydraulic circuit comprising a first hydraulic line that, when pressurized, causes the undercarriages to be lowered, and a second hydraulic line, that, when pressurized, causes the undercarriages to be raised. Those lines are pressurized selectively by means of a hydraulic distribution member comprising a general isolation valve for selectively isolating the hydraulic circuit from the pressure source of the aircraft, and at least one selector for putting one of the lines into communication with pressure and the other line in communication with return.

In the event of a failure, for example if the selector remains stuck in an intermediate position in which it closes both lines and keeps hydraulic fluid captive in the actuators, lowering of the landing gear can be prevented. It is therefore important to provide the hydraulic circuit with means for enabling at least the raising line to be put into communication with the return so that the landing gear is not prevented from being lowered, at least under gravity. In this respect, it is known to provide the circuit with a general decompression valve that is controlled directly by the pilot by means of a cable, or else by an electric motor that is actuated when the pilot presses a switch to go to emergency extension mode. The decompression valve connects both lines to the return, thereby avoiding any fluid being held captive in the actuators and preventing the landing gear from being lowered.

In certain recent aircraft, proposals have been made for an architecture as shown diagrammatically in FIG. 1 in which there is no longer a general decompression valve, but rather a plurality of decompression valves relocated close to the undercarriages.

The operating system shown in this figure is intended to operate the undercarriages of the aircraft together with the associated wheel-bay doors. The description below is based on an example of an aircraft having two main undercarriages and one auxiliary undercarriage (nosewheel).

To operate the undercarriages, the system comprises various actuators, including:

jacks 1 for moving the undercarriages, in which jacks the annular chamber (through which the piston rod passes) is connected to return in this example, while the full chamber (without the piston rod) is connected to a hydraulic line 5 marked "UP" in the figure, such that the jacks 1 cause the undercarriages to be raised when the "UP" line 5 is under pressure, and said jacks 1 do not oppose the undercarriages lowering under the effect of gravity when the "UP" line 5 is connected to return;

locking and unlocking cylinders 2 for locking/unlocking the struts of the undercarriages, each having an annular chamber connected to the "UP" line 5, while its full chamber is connected to a hydraulic line 6 marked "DOWN", such that said locking/unlocking cylinders 2 act to unlock the struts while the undercarriages are being raised, with the "UP" line 5 under pressure and the "DOWN" line 6 connected to return, and so that said locking/unlocking cylinders 2 act to lock the struts when the "UP" line 5 is connected to return and the "DOWN" line 6 is under pressure; and hooks 3 for co-operating with catch ferrules disposed on the undercarriages to hold them in the raised position, and actuated by hydraulic cylinders 4 in which the full chambers are connected to the "UP" line 5 and the annular chambers are connected to the "DOWN" line 6, such that said cylinders act to cause the hooks to close onto the catch ferrules of the undercarriages in order to hold the undercarriages in the raised position after they have been raised with the "UP" line 5 under pressure and the "DOWN" line 6 connected to return, and said cylinders also act to release the catch ferrules and allow the undercarriages to be lowered when the "UP" line 5 is connected to return and the "DOWN" line 6 is under pressure.

Upstream from the actuators, a selective distribution member enables pressure to be admitted into the landing gear operating system, and enables pressure to be distributed selectively to the "UP" line 5 or to the "DOWN" line 6, with the other line being connected to return.

More precisely, the distribution member comprises:

an insulating valve 10 controlled by a driver computer 50 and serving to admit or not admit pressure to the landing gear control circuit;

a cutoff valve 11 for performing a function that is described in greater detail below and that, by default, is open; and a three-position selector 12 controlled by the driver computer 50 having a neutral first position for connecting both the "DOWN" line 6 and the "UP" line 5 to return, a lowering position connecting the "DOWN" line 6 to pressure and the "UP" line 5 to return, and a raising position for connecting the "UP" line 5 to pressure and the "DOWN" line 6 to return.

As mentioned in the figure, although not shown, the hydraulic circuit includes a similar selector for the doors of the landing-gear wheel-bays, and downstream from the door selector, door actuators including door-moving jacks and hooks.

Operation is as follows. Starting from the situation in which the aircraft is in flight and the landing gear is raised, the driver computer 50 begins by controlling the isolation valve 10 to open, and thus to admit pressure to a feed line 20 going from the isolation valve 10 to the selector 12. The selector 12 is in the neutral position so both the "DOWN" line 6 and the "UP" line 5 are connected to return. The driver computer 50 then puts the selector 12 into the lowering position so that pressure is admitted to the "DOWN" line 6, with the "UP" line 5 being kept connected to return. The doors open, the hooks 3 are controlled to release the undercarriages, and the undercarriages move downwards under gravity, to a deployed position in which the locking/unlocking cylinders 2 force the struts to lock, thereby stabilizing the undercarriages in their deployed positions.

When the aircraft has landed and subsequently taken off again, it suffices to place the selector 12 in the raising position so that the "UP" line 5 is pressurized while the "DOWN" line 6 is kept connected to return. The locking/unlocking cylinders 2 release the struts, thereby enabling the undercarriages to be raised under drive from the jacks 1. Once the raised position is reached, the hooks 3 hook onto the catch ferrules of the undercarriages so as to hold them in the raised position. The doors are then reclosed, and the selector 12 (and also the door selector) is returned to the neutral position.

It then suffices to cease applying a control signal to the isolation valve 10 so that it returns to its rest position in which the selector feed line 20 is connected to return.

Certain failure configurations, although statistically most unlikely, could prevent the landing gear from deploying. By way of example, the configuration is considered in which the selector 12 remains jammed in an intermediate position in which it closes off both the "DOWN" line 6 and the "UP" line 5. Under such circumstances, hydraulic fluid cannot be expelled from the full chamber of the jacks 1, so the undercarriages are blocked. To mitigate this drawback, the circuit includes three decompression valves 13 located close to the undercarriages. The decompression valves 13 are normally closed, but in an emergency they can be controlled to connect the "DOWN" line 6 and the "UP" line 5 to return, so as to eliminate any risk of hydraulic fluid being held captive in the chambers of the actuators 1, 2, 4.

For this purpose, the decompression valves 13, the cutoff valves 11, and the hooks 3 are provided with respective electromechanical actuator members each constituted in this example by two electric motors under the control of an emergency computer 51 that is activated by the pilot in the event of failure in the normal operation of the circuit, and that takes over from the driver computer.

On being activated, the emergency computer 51 actuates the cutoff valve 12 to prevent pressure being admitted into the circuit, and connects the admission line 20 to return. The emergency computer then controls the decompression valves 13 so as to connect both the "DOWN" line 6 and the "UP" line 5 to return. Finally, the emergency computer 51 controls the hooks so that they release the undercarriages, with the undercarriages lowering under the effect of gravity down to the deployed position in which the struts are locked mechanically by springs, as is well known.

OBJECT OF THE INVENTION

The invention seeks to provide an architecture of simplified structure for a system for operating the landing gear of an aircraft.

BRIEF DESCRIPTION OF THE INVENTION

In order to achieve this object, the invention provides an architecture for a hydraulic system for operating landing gear of an aircraft that includes at least one source of hydraulic pressure and at least one hydraulic return, the hydraulic system for operating the landing gear comprising actuators for operating undercarriages, which actuators are connected to a hydraulic circuit comprising a first hydraulic line that, when pressurized, causes the undercarriages to be lowered, and a second hydraulic line that, when pressurized, causes the undercarriages to be raised, said lines being pressurized selectively by means of a hydraulic distribution member comprising at least one isolation valve for selectively isolating the hydraulic circuit from the pressure source of the aircraft, and at least one selector for putting one of the lines into communication with pressure and the other line in communication with the return. According to the invention, the architecture includes passive shunt means for bypassing the selector, said passive means being placed between the second line and an admission line that extends between the isolation valve and the selector, and that normally conveys the pressure of the aircraft, said passive shunt means passing fluid flow from the second line towards the admission line, but blocking flow in the opposite direction.

BRIEF DESCRIPTION OF THE DRAWINGS

In addition to FIG. 1 that shows an architecture making use of known solutions, the invention can be better understood in the light of the following description with reference to FIG. 2 which is a diagram of an architecture for a system for controlling landing gear (and the associated wheel-bay doors) in a particular embodiment of the invention.

DETAILED DESCRIPTION OF THE INVENTION

Figure 1:
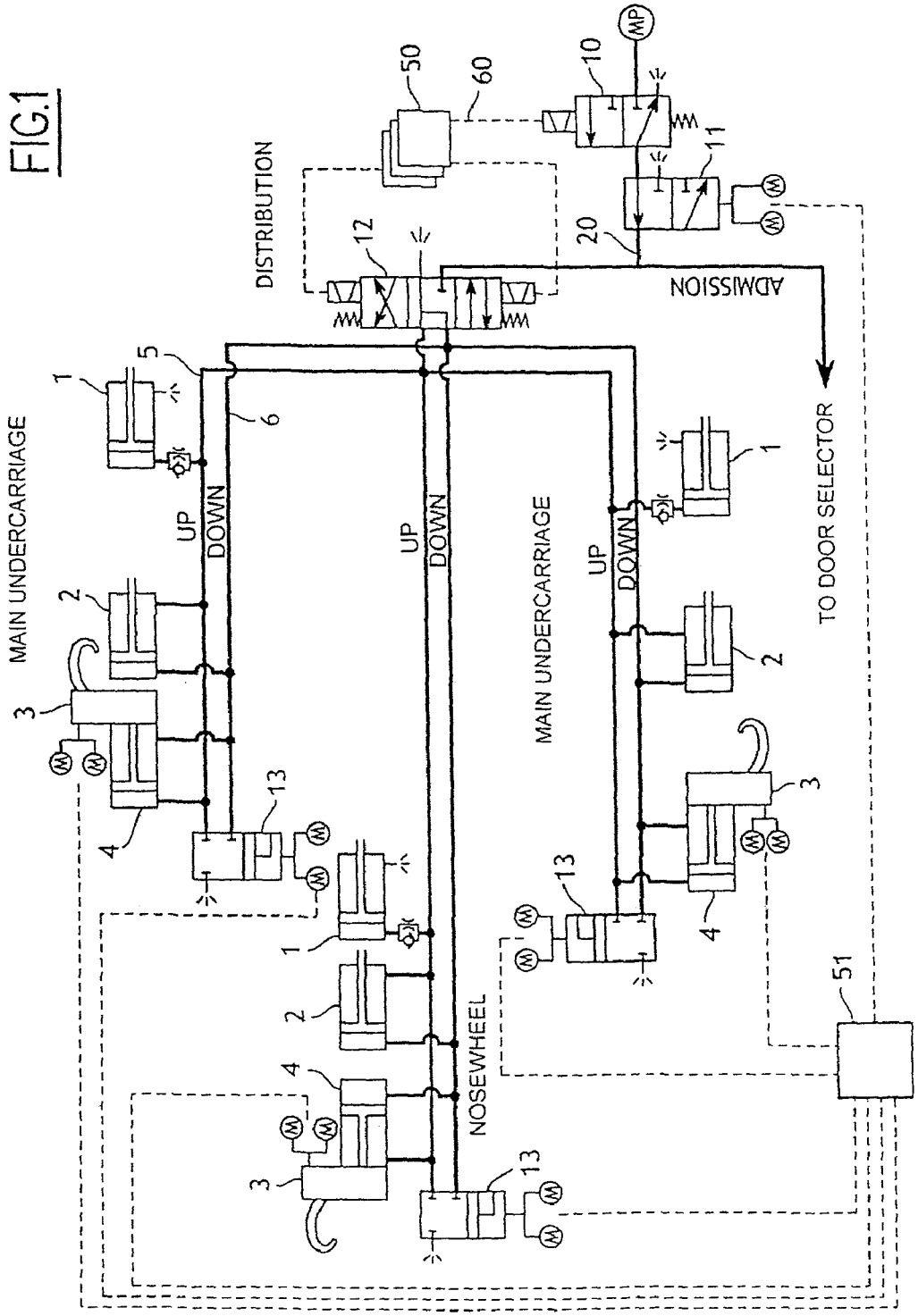
Figure 2:
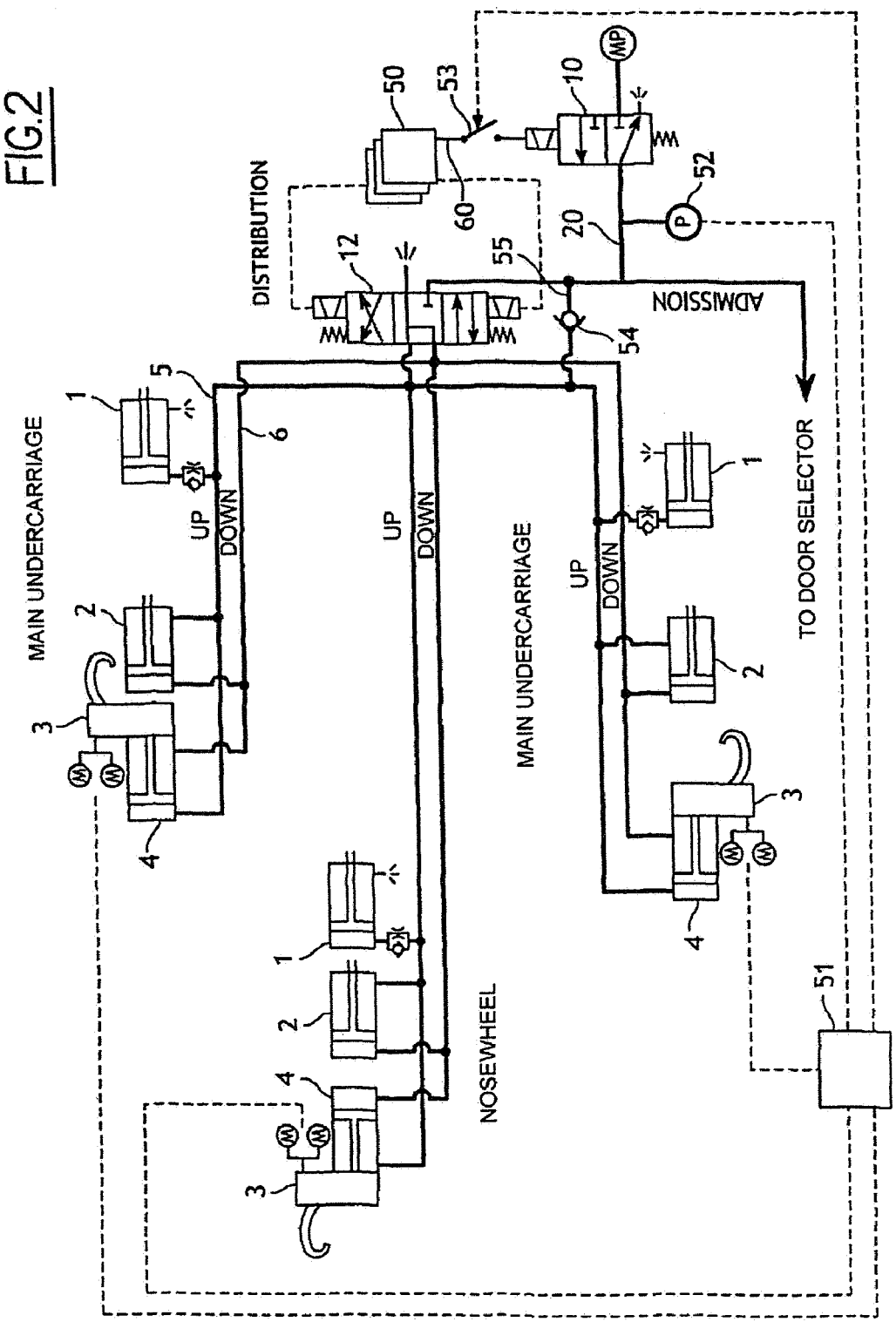

In FIG. 2, elements that are common with elements in FIG. 1 retain the same references. FIG. 2 is a diagram that is very similar to that of FIG. 1, with the exception that the decompression valves 13 and the cutoff valve 11 have been eliminated.

Instead, the following have been installed:
 a pressure sensor 52 on the feed line, providing a pressure measurement that is delivered to the emergency computer 51;
 a relay 53 in an electrical control line 60 going from the driver computer 50 to the isolation valve 10, the relay 53 being controlled by the emergency computer 51; and
 a check valve 54 placed in a branch connection 55 between the "UP" line 5 and the admission line 20, the check valve passing fluid flow from the "UP" line 5 towards the admission line 20, and preventing flow in the opposite direction.

The circuit shown in FIG. 2 operates as follows. When pressure is admitted into the admission line 20, the check valve 54 is blocked by the pressure acting in the admission line 20, such that it closes the branch connection 55. The normal operation of this circuit is then completely identical with that of the circuit shown in FIG. 1.

In the event of a problem, the pilot actuates the emergency computer 51, which takes over and uses the pressure sensor 52 to verify whether the admission line 20 is being fed with pressure. If the pressure in the admission line 20 exceeds a predetermined threshold greater than the return pressure, the emergency computer 51 controls the relay 53 to interrupt the control line 60 between the computer 50 and the isolation valve 10, thereby having the effect of causing the isolation valve 10 to return to its isolation position in which the admission line 20 is connected to return.

Thereafter the emergency computer 51 causes the electromechanical actuator members of the hooks 3 to operate so as to release the undercarriages. The undercarriages descend under gravity, repelling the fluid contained in the "UP" line 5 either through the selector 12, or if it has stuck in a blocking intermediate position, through the check valve 53. The check valve 53 thus constitutes totally passive means for bypassing the selector 12, which means open automatically as the undercarriages move downwards, without requiring any control signal from the emergency computer 51.

The chambers connected to the "DOWN" line 6 are connected to return via the selector 12. It should be observed that all of the chambers connected to the "DOWN" line 6 have their volumes increased as the undercarriages move downwards, such that even if the selector 12 is held in a blocking intermediate position, the fluid contained in said chambers and in the "DOWN" line 6 will not prevent the undercarriages from lowering, even though the fluid does indeed suffer cavitation.

It should be observed that in the proposed architecture, the emergency computer 51 no longer controls the electromechanical members for actuating the hooks 3 and the relay 53, thereby likewise enabling the emergency computer 51 to be simplified.

In an even simpler variant, it is possible to omit the pressure sensor 52, providing the precaution is taken in emergency operation mode, to control the relay 53 every time in such a manner as to interrupt the control line between the driver computer 50 and the isolation valve 10. This guarantees that the admission line 20 is connected to return, such that the check valve 54 is not prevented from opening while the undercarriages are moving downwards.

The architecture as proposed in this way is thus much simpler, and the emergency equipment used (relay 53, check valve 54, and where appropriate pressure sensor 52) is made up of basic items that are inexpensive. This emergency equipment is much lighter in weight and less complex than the decompression valves 13 and the cutoff valve 11, which include electromechanical actuator members that are heavy and complex.

The invention is not limited to the above description, but on the contrary covers any variant coming within the ambit defined by the claims.

In particular, although the invention is shown herein in application to a system for operating landing gear in which the undercarriages move downwards under the effect of gravity, the invention clearly also applies to a system in which the undercarriages are moved downwards under the effect of pressure.

Although passive means are described for bypassing the selector that extend between the "UP" line and the admission line 20 in the form of a branch connection fitted with a check valve mounted to pass flow from the "UP" line towards the admission line 20, the means for passively bypassing the selector could be integrated directly in the selector.

Although the means for forced connection to return (i.e. for isolating the pressure circuit from the pressure source of the aircraft and for connecting the admission line 20 to return) are described as comprising a relay that interrupts an electric control line of the isolation valve, said means could have other forms, such as an electromechanical member for actuating the isolation valve under the control of the emergency computer to force the isolation valve towards its rest position, even though, a priori, such a solution appears to be heavier.

Finally, although the architecture shown includes both passive means for bypassing the selector and means for forcing the isolation valve to be connected to return, it would be possible to use only one of these two means, leading to intermediate architectures which, although not fully optimized, nevertheless provide improvements in terms of weight, complexity, and cost compared with known solutions.

What is claimed is:

1. An architecture for a hydraulic system for operating landing gear of an aircraft that includes at least one source of hydraulic pressure and at least one hydraulic return, the hydraulic system for operating the landing gear comprising actuators for operating undercarriages, which actuators are connected to a hydraulic circuit comprising a first hydraulic line that, when pressurized, causes the undercarriages to be lowered, and a second hydraulic line that, when pressurized, causes the undercarriages to be raised, said lines being pressurized selectively by means of a hydraulic distribution member comprising at least one isolation valve for selectively isolating the hydraulic circuit from the pressure source of the aircraft, and at least one selector for putting one of the lines into communication with pressure and the other line in communication with return; the architecture including passive shunt means for bypassing the selector, said passive shunt means being placed between the second line and an admission line that extends between the isolation valve and the selector, and that normally conveys the pressure of the aircraft, said passive shunt means passing fluid flow from the second line towards the admission line, but blocking flow in the opposite direction.

2. An architecture according to claim 1, in which the passive shunt means comprise a branch connection extending between the second line and the admission line, said branch connection being fitted with a check valve mounted to pass fluid from the second line towards the admission line.

3. An architecture according to claim 1, further including forced return connection means for forcing the isolation valve to isolate the pressure circuit of the aircraft and to connect the admission line to return.

4. An architecture according to claim 3, in which the forced return connection means comprise a relay connected to interrupt selectively an electrical control line for controlling the isolation valve so that the valve returns to or remains held in a position in which it connects the admission line to return.

5. An architecture according to claim 4, in which the forced return connection means are triggered only in response to pressure being present in the admission line above a predetermined threshold higher than the return pressure.

* * * * *